US005963531A

United States Patent [19]

Takahashi

[11] Patent Number: 5,963,531

[45] Date of Patent: Oct. 5, 1999

[54] OPTICAL HEAD APPARATUS

[75] Inventor: Junichi Takahashi, Tokyo, Japan

[73] Assignee: NEC Corporation, Tokyo, Japan

[21] Appl. No.: 08/958,693

[22] Filed: Oct. 27, 1997

[30] Foreign Application Priority Data

Oct. 28, 1996 [JP] Japan .................................... 8-285569

[51] Int. Cl.[6] ........................................................ G11B 7/12

[52] U.S. Cl. ............................................ 369/112; 369/109

[58] Field of Search .................................... 369/112, 110, 369/103, 44.12, 109, 44.14

[56] References Cited

FOREIGN PATENT DOCUMENTS

| | | |
|---|---|---|
| 63-32730 | 2/1988 | Japan . |
| 63-28421 | 9/1988 | Japan . |
| 2128327 | 5/1990 | Japan . |
| 2137130 | 5/1990 | Japan . |
| 2168213 | 6/1990 | Japan . |

OTHER PUBLICATIONS

"Pit Depth Encoded Memories" Marx et al. Department of Electrical Engineering California Institute of Technology; pp. 41–42; publication date unknown.

*Primary Examiner*—Muhammad Edun

*Attorney, Agent, or Firm*—Hayes Soloway Hennessey Grossman & Hage PC

[57] ABSTRACT

A light beam reflected from an optical disc 1 is passed through an objective lens and a beam splitter to a detective lens. Two diffraction gratings having the same diffraction pitch, i.e., a first diffraction grating and a second diffraction grating, are disposed so that they are relatively inclined at a given angle to each other. Signal beams are detected by a photodetector. When the focusing position of the objective lens relative to the optical disc 1 is shifted in the focusing direction, the focusing position of a light beam from the objective lens is changed, resulting in changed inclination angle $\alpha$ of moire fringes on the photodetector. Thus, provision of two gratings relatively inclined at a given angle to each other enables detecting signals to be obtained based on the angle signals of the moire fringes even from minute errors with respect to focusing errors on an optical disc or multi-value of pit.

5 Claims, 2 Drawing Sheets

16 OPTICAL DISK
14 OBJECTIVE LENS
13 BEAM SPLITTER
15 PHOTODETECTOR
DIFFRACTION GRATING 12
SEMICONDUCTOR LASER 11

OPTICAL HEAD APPARATUS

FIELD OF THE INVENTION

The present invention relates to an optical head apparatus in an information reproduction system of an optical recording/reproducing apparatus for recording and reproducing information optically recorded in an optical disc and the like, and particularly to, an optical head apparatus which enables an optical disc to be tracked with high definition by a focusing spot and can cope with an increaae in density.

BACKGROUND OF THE INVENTION

A conventional optical head apparatus comprises: a diffraction grating for producing three beams for detecting tracking errors based on a light beam emitted from a semiconductor laser; and a beam splitter which reflects the three beams to allow the three beams to enter an optical disc and, in addition, permits a reflected light beam received from the optical disk through the objective lens to pass therethrough and to enter a photodetector.

In this optical head apparatus, three beams produced in the diffraction grating are applied to the optical disc, and the diffracting position of the diffraction grating is set so that the +first-order light beam and the −first-order light beam are located respectively before and after the direction of advance of tracking pit, and tracking errors are detected based on the difference between the +first-order light beam and the −first-order light beam. Further, a light beam reflected from the optical disc is passed through a beam aplitter to produce astigmatism, and focusing errors are detected based on this.

Another conventional optical head apparatus is provided with a detecting optical system using, for example, a moire fringe. This optical head apparatus is described in Japanese Patent Laid-Open Nos. 168213/1990 and 137130/1990.

The conventional optical head apparatus, however, has the following disadvantages.

The first problem is as follows. There is a demand for an increase in capacity of information signals recorded on an optical disc, and, in fact, the increase in density has been advanced in the art. Regarding the detection of errors by the positional control of the focusing beam, the magnification has been determined in such a manner that the degree of a variation in spot on the optical disc relative to the degree of a variation on the detecting optical system does not lead to an increase in the optical head apparatus. The sole method for realizing a high definition detection sensitivity corresponding to an increase in information density is to increase the magnification and to increase the length of the optical path within the optical head apparatus. A design of a high-density error detection system, which can cope with the increase in information density was impossible from the viewpoint of the limitation of the geometry of the optical head apparatus.

The reason for this is as follows. The sole method for as detecting the displacement on the information face of the optical disc is to direct a design requiring an increase in optical magnification on the objective lens side and the detecting optical system side. Increasing the optical magnification, however, has resulted in increased length of the optical path within the optical head apparatus, leading to an increase in size of the optical head apparatus. Increasing the magification means that the distance between the semiconductor laser and the objective leas is increased. Due to the properties of the semiconductor laser an a divergent beam, the efficiency for light utilization is lowered resulting in deteriorated reproduced signals. On the other hand, satisfying the efficiency for light utilization recuires increasing the effective diameter of the objective lens, leading to an increase in the size of the optical head apparatus.

The second problem is as follows. The optical construction for detecting optical error signals is one of the factors which increase the size of the optical head. This is an obstacle to a reduction in size. In the conventional focusing error detection system, an astigmatism system using a half mirror has been mainly used. In this system, a restriction on the design of the optical head necessitates increasing the length of the optical path by using a concave lens. In the error detection of an optical disc having a multi-value structure for realizing further increased information density, the geometry of pits is reduced according to the multi-value, posing a problem that the magnification for the detection of the conventional optical head apparatus does not provide satisfactory resolution.

SUMMARY OF THE INVENTION

Accordingly, it is an object of the invention to provide an optical head apparatus in which the size can be reduced, while detecting signals are obtained even from minute errors.

It is another object of the invention to provide an optical head apparatus in which reproducing signals are obtained at a high and wide bandwidth, and information signals of a high density are read from an optical disc.

According to the invention, an optical head apparatus, comprises:

a light source for emitting a light beam to be focused on an optical disc:

means for reproducing, upon receipt of a reflected light beam, information recorded in the disc;

a first diffraction grating and a second diffraction grating spaced at a fixed distance apart on an optical path of the reflected light; and means for preparing a contrast of moire fringes created by the first and second diffraction gratings and detecting a focusing error of the light beam on the optical disc based on the angle of the moire fringes.

(1) in the optical head apparatus of the present invention constructed so that a laser spot is applied to an optical disc to detect the state of information recorded on the recorded face of the optical disc, thereby reading the recorded information, wherein two gratings spaced at a fixed distance apart are disposed at a given relative angle to each other in an error detection optical system to create a moire fringe contrast by the two gratings on a photodetection element and information on a focusing error on the optical disc can be obtained from information signals on the angle of the moire fringes.

(2) in the optical head apparatus of the present invention, use of the detecting optical construction described in (1) in a reproducing signal detecting optical system enables reproduced signals of a high and wide bandwidth and, in addition, high-density information signals to be read by utilizing minute angle information and reproduction to be made with respect to the multi-value of pit.

(3) The optical head apparatus of the present invention comprises a first diffraction grating for diffracting a beam to be focused by a detecting lens to prepare a moire fringe, a second diftraction grating for allowing the light beam diffracted by the first diffraction grating to interfere, and a photodetection system constructed so that two diffraction gratings, i.e., first and second diffraction gratings, are disposed at a given relative angle to each other to detect the created moire fringe.

DESCRIPTION OF THE DRAWINGS

The invention will be described in more detail in conjunction with appended drawings, wherein.

DESCRIPTION OF THE PREFERRED EMBODIMENTS

Before explaining an optical head apparatus in the preferred embodiment according to the invention, the aforementioned conventional optical heads will be explained in more detail.

Optical memory techniques such as a high-density, high-capacity optical disc have expanded digital audio discs, video discs, and data files and applications and, in addition, have put digital video discs, of which the density and capacity are seven or more times those in the prior art, into practical use. In the optical memory techniques, information in recorded and reproduced with high reliability through an optical beam concentrated to the order of micron. This largely relies upon an increase in performance of the optical technique of the optical head apparatus.

Fundamental functions in an optical head apparatus in which optical techniques have been put together are roughly classified into three groups, a function of focus which forms minute spots of diffraction limit, a function of focusing control of minute spots of the optical system and signal detection for pits, and a function of tracking control of minute spots of the optical system.

These are realized by combining various optical systems and photoelectric conversion detection system according to the purpose and the application.

The conventional optical head apparatus will be described with reference to the accompanying drawing.

Figure 1:
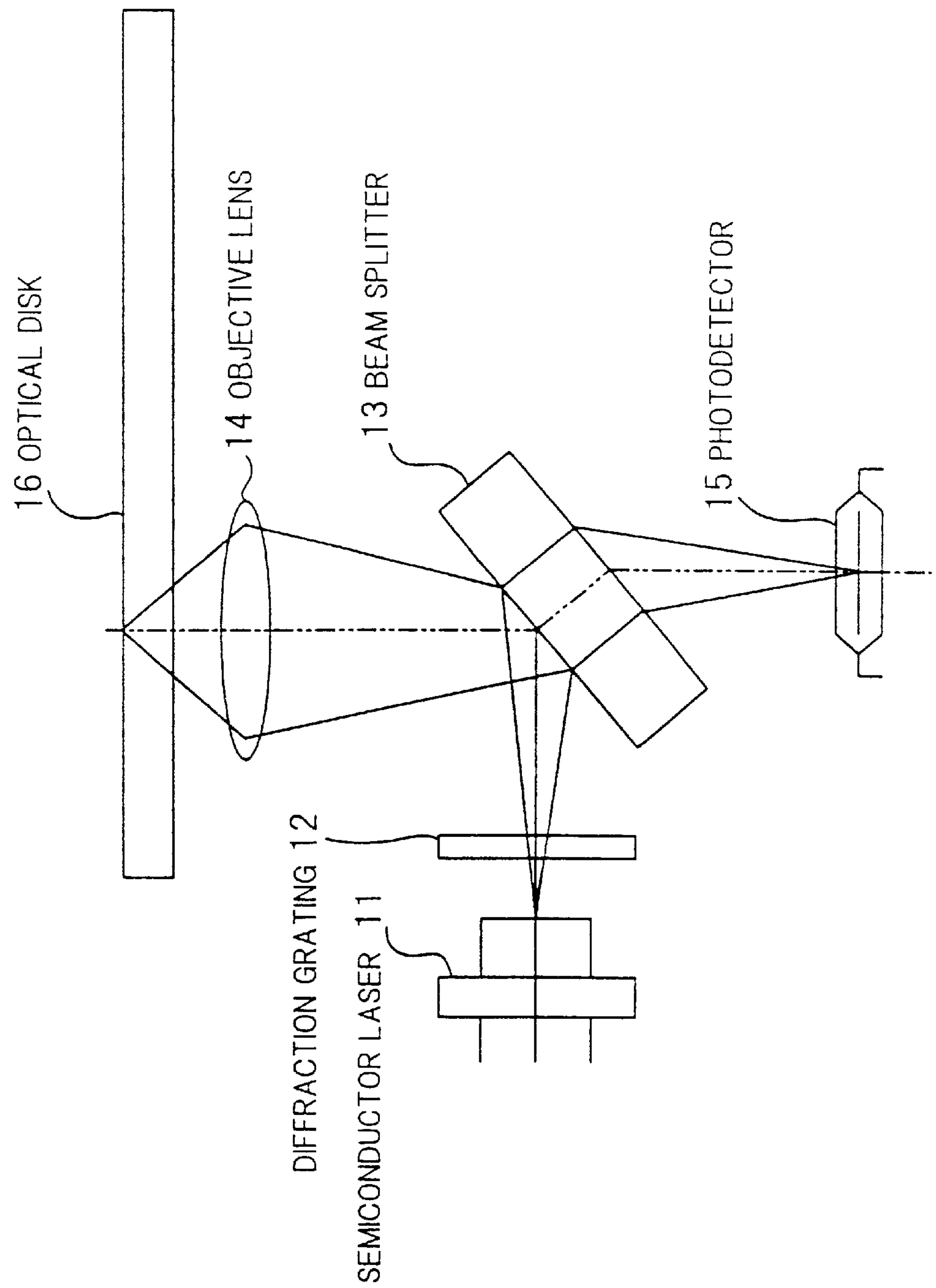
FIG. 1 is a block diagram of an optical system according to an embodiment of the conventional optical head apparatus.

FIG. 1 is a block diagram of an optical system according to one embodiment of a conveutional optical head apparatus.

This conventional optical head apparatus comprises a semiconductor laser 11, a diffraction grating 12, a beam splitter 13, an objective lens 14, and a photodetector 15. Minute spots are formed by light beams on an optical disc 16, and reflected light beam are used as reproduction signals.

In this case, light from a semiconductor laser 11 is passed through the diffraction grating 12 to produce three beams for detecting tracking error signals which are reflected from the beam splitter 13 and focused by the objective lens 14. Beams reflected from a signal face of an optical disc 16 enter, through the objective 14 and the beam splitter 13, the photodetector 15 in its light receiving to face where the beams are converted to electrical signals to obtain information signals.

In a conventional focusing error signal detection for controlling minute spots by conforming the beam to the swing of the plane of the optical disc 16, beams reflected from the optical disc 16 again enter the objective lens 14, astigmatism is produced, for example, by means of the beam splitter 13, and the beams are then directed to the signal detecting optical system and enter the photodetector 15 to conduct the detection of a focusing error.

Thus, upon deviation of minute spots applied to the optical disc 16 from the focusing position, error signals corresponding to the degree of the swing of the optical disc 16 are obtained, and control signals for negating the error signals can be applied to a lens actuator, permitting minute spots to be always controlled to the focusing position.

The detection of tracking error signals for conformation to the decentering of the optical disc 16 are performed in such a manner that three beams produced in the diffraction grating 12 are directed to the optical disc 16, the rotation position of the diffraction grating 12 is set so that the +first-order light beam and the −first-order light beam are located respectively before and after the direction of advance of tracking pit, and the difference between the +first-order light beas and the −first-order light beam is determined to detect tracking error signals.

According to this mechanism, as with the focusing mechanism, upon deviation of minute spots applied to the optical disc deviate from the target track position, error signals corresponding to the degree of decentering of the optical disk 16 are obtained. Therefore, control signals for negating the error signals can be applied to the lens actuator to always control the minute spots on the target track.

Due to the swing of the plane and decentering, the light beam focused to about 1 $\mu$m deviates from the information signal portion, while the objective lens in supported on a lens actuator movable on two axes of focusing and tracking to regulate the focusing spot to the information signal portion with high accuracy.

In the above optical information reproducing apparatus, there is a demand for increasing the record capacity, and, in this apparatus, reducing the size of the light spot applied on the optical disc is indispensable for increasing the information density.

The size of the minute spots on the optical disc depends upon the wavelength $\lambda$ of the laser and the numerical aperturea NA of the objective lens. Therefore, at the present time, a design for reducing the size of the irradiation spot in to reduce $\lambda$ or to increase NA.

In FIG. 1, the objective lens 14 produces a minute light beam from the light beam from the semiconductor laser 11. The minute light beam thus produced is directed to the optical disc 16 in its recorded signal portion to reproduce signals recorded on the optical disc 16.

A demand for increasing the capacity of information signals recorded an the optical disc has led to increased density of the information signals. This requires high accuracy in the detection of errors by the control of the position of the focusing beam.

The optical system for detecting optical error signals is also one of the factors which increase the size of the optical head. This has been an obstacle to a reduction in size.

In a conventional focusing error detection system, an astigmatism system or the like using a half mirror has been mainly used. in this system, a restriction on the design of the optical head has necessitated increasing the length of the optical path by using a concave lens. The error detection of an optical disc having a multi-value structure for achieving further increased information density could not have been adopted due to unsatisfactory resolution.

Japanese Patent Laid-Open Nos. 168213/1990 and 137130/1990 have proposed a detecting optical system using a moire fringe for reducing the size of the optical head apparatus. The optical construction using the detection of a moire fringe has achieved detection of focusing signals and tracking signals while providing a simple optical construction. In the optical system of the conventional optical head apparatus, however, the magnification should be increased for offering a high-accuracy detection sensitivity corresponding to an increase in high information density. The sole method for attaining this object is to increase the length of the optical path within the optical head apparatus. Due to a restriction on the geometry of the optical head apparatus, it is impossible to design a high-accuracy error detection system which can cope with a further increase in information density.

Next, an optical head apparatus in the preferred embodiment according to the present invention will be explained in FIGS. 2 and 3.

Figure 2:
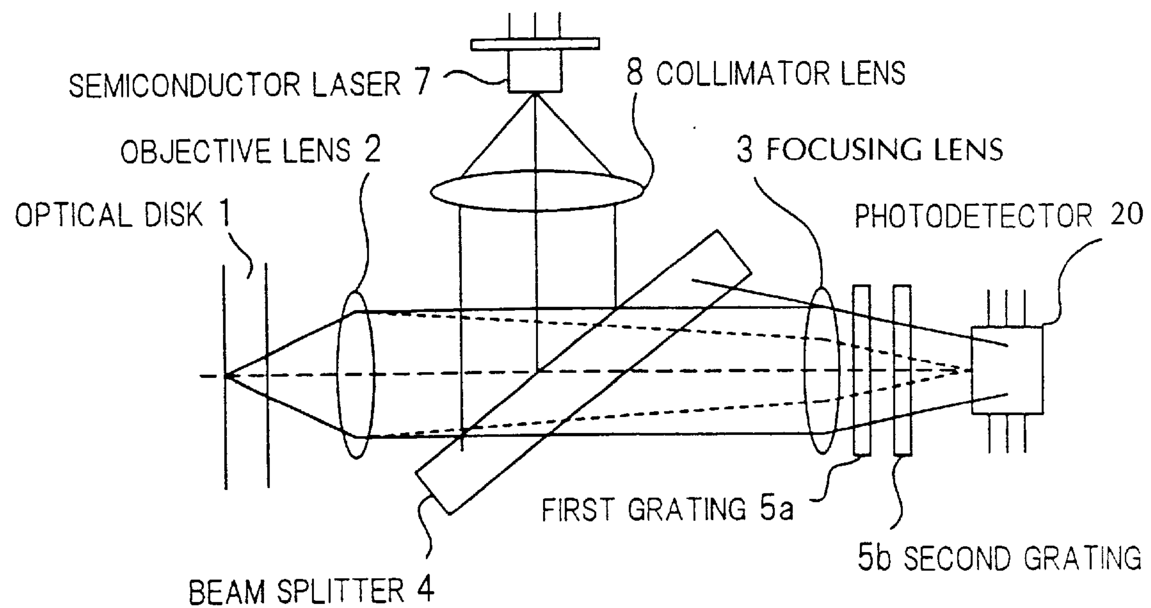
FIG. 2 is a block diagram of an optical system according to an embodiment of the optical head apparatus of the present invention.
Figure 3:
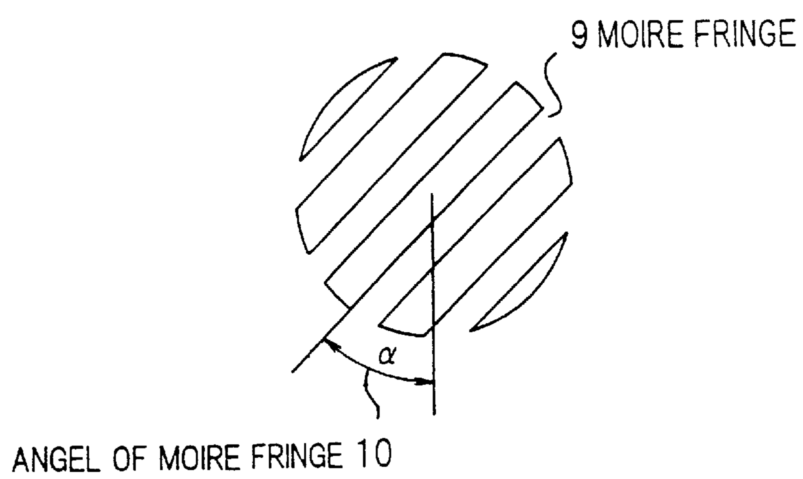
FIG. 3 is a diagram showing a moire fringe obtained by the optical head apparatus according to this embodiment.

FIG. 2 is a block diagram showing an optical system according to one embodiment of the optical head apparatus of the present invention, and FIG. 3 a diagram showing a moire fringe created by the optical head apparatus according to this embodiment.

A light beam from a semiconductor laser 7 as a light source is passed through a collimator lens 8 to convert the emitted beam to a parallel beam which is then reflected from a beam splitter 4 and enters an objective lens 2 to reproduce recorded information by using a minute spot.

The light beam reflected from the optical disc 1 is passed through the objective lens 2 and then passed through the beam splitter 4 and directed to a focusing lens 3. Two diffraction gratings having the same diffraction pitch, i.e., a first diffraction grating 5*a* and a second diffraction grating 5*b*, are disposed so that they are relatively inclined at a given angle to each other. Signal beams are detected by a photodetector 20. When the focusing position of the objective lens 2 relative to the optical disc 1 is shifted in the focusing direction, the focusing position of a light beam from the objective lens 2 is changed, resulting in changed inclination angle $\alpha$ of moire fringes on the photodetector 20.

FIG. 3 is a diagram showing the state of moire fringes created by a detecting optical construction according to the present invention. The relationship between the inclination angle $\alpha$ of the moire fringe angle 10 and the focal distance f of the focusing lens 3 is expressed by the follow equation:

$$f=\{1/\sin\theta \tan \alpha+\cos\theta-1)\}kp2/\lambda$$

wherein k represents a natural number, $\lambda$ represents the wavelength and p represents the grating pitch.

The inclination angle $\alpha$ of the moire fringe angle 10 is expressed by the equation: $Z=kp2f/(\lambda f+kp2)$.

In this case, z represents the distance between two gratings, and disposition of the two gratings while leaving an optimal distance therebetween can offer moire fringes with a good contrast.

Therefore, the above equation for the focal distance f can be rewritten as: $f=1/(1/z-\lambda kp2)$. Since $\lambda$, k, and p are fixed in the optical head, the focal distance f can be determined, and the error in the focusing direction of the objective lens and the optical disc can be detected through the design of the magnification of the optical system.

Specifically, since the wavelength and the grating pitch can be designed to have respective fixed values within the optical head, the focal length f can be determined, enabling the error in the focusing direction of the objective lens and the optical disc to be detected with high resolution on the order of wavelength through the design of the magnification of the optical system.

The first grating 5*a* and the second grating 5*b* can be achieved using a general grating in a slit form. Further, in an optical system where the efficiency for light utilization should be taken into consideration, such as an optical head apparatus having a recording function, the present invention can be achieved by a phase type grating, enabling use of inexpensive components to suffice for achieving a detecting optical system with high resolution.

The first effect is that the construction of the present invention enables very small pit height or very small information pits and reproduction by high-speed reading to be achieved by an optical head apparatus having simple optical construction, leading to realization of an increase in capacity of an optical recording/reproducing apparatus.

The reason for this is as follows. The relationship between the inclination angle of the moire fringe and the focal distance f of the detecting lens may be expressed by the following equation:

$$f=\{1/\sin\theta \tan \alpha+\cos\theta-1)\}kp2/\lambda$$

The above equation for the focal distance f can be rewritten as: $f=1/(1/z-\lambda kp2)$. Since $\lambda$, k, and p can be designed to have respective fixed values within the optical head, the focal distance f can be determined, and the error in the focusing direction of the objective lens and the optical disc can be detected with high resolution on the order of wavelength through the design of the magnification of the optical system.

The second reason is as follows. In the conventional focusing error detection system, an astigmatism system or the like sing a half mirror has been mainly used. In this system, a restriction on the design of the optical head has necessitated increasing the length of the optical path by using a concave lens. Further, in the error detection of an optical disc having a multi-value structure for achieving further increased information density, the astigmatism and other systems could not have been adopted due to unsatisfactory resolution. On the other hand, Japanese Patent Laid-Open Nos. 168213/1990 (page 1, lines 5 and 21 and FIG. 1) and 137130/1590 (page 1, lines 5 and 22 and FIG. 1) have proposed a detecting optical system using a moire fringe for reducing the size of the optical head apparatus. In the optical system of the conventional optical head apparatus, however, the magnification should be increased for offering a high-accuracy detection sensitivity corresponding to an increase in high density. The sole method for attaining this object is to increase the length of the optical path within the optical head apparatus. Due to a restriction on the geometry of the optical head apparatus, it is impossible to design a high-accuracy error detection system which can cope with a further increase in information density. By contrast, according to the construction of the present invention, various signals can be detected using the angle of moire fringes. Therefore, the resolution which has been achieved by the light path length in the prior art can be achieved by utilizing the angle of diffraction grating disposed, eliminating the need to increase the length of the optical path within the optical head.

The invention has been described in detail with particular reference to preferred embodiments, but it will be understood that variations and modifications can be effected within the scope of the invention as set forth in the appended claims.

What is claimed is:

1. An optical head apparatus, comprising:

a light source for emitting a light beam to be focused on an optical disc;

means for reproducing, upon receipt of a reflected light beam, information recorded in the disc;

a first diffraction grating and a second diffraction grating spaced at a fixed distance apart in an optical path of the reflected light, said first diffraction grating and said second diffraction grating having the same diffraction pitch, and being disposed so that they are relatively inclined at a given angle to one another;

a focusing lens disposed in said optical path before said first diffraction grating; and means for preparing a contrast of moire fringes created by the first and second diffraction gratings and detecting a focusing error of the light beam on the optical disc based on the angle of the moire fringe.

2. The optical head apparatus as defined in claim 1, wherein:

the means for detecting the focusing error uses an optical system for the means for reproducing the information.

3. The optical head apparatus as defined in claim 1, wherein:

the first diffraction grating diffracts a light beam focused by said focusing lens, the second diffraction grating allows the light beam diffracted by the first diffraction grating to interfere, and the means for detecting the focusing error comprises a detecting section for detecting the moire fringe and a computing section for computing the focusing error based on the angle of moire fringe.

4. The optical head apparatus as defined in claim 1, wherein:

the means for detecting the focusing error sets the relative angle of the first and second diffraction gratings to a predetermined value.

5. The optical head apparatus as defined in claim 1, wherein the focusing lens is fixed at a focal distance f according to the following equation:

$$f=\{1/\sin\theta \tan \alpha+\cos\theta-1)\}kp2/\lambda$$

wherein k represents a natural number, λ represents wavelength of the reflected light, and p represents pitch of the diffraction gratings.

* * * * *